United States Patent [19]

Sasaki

[11] Patent Number: 5,740,877

[45] Date of Patent: Apr. 21, 1998

[54] DRIVING-TORQUE DISTRIBUTION CONTROL SYSTEM FOR FOUR-WHEEL DRIVE VEHICLES

[75] Inventor: Hiroki Sasaki, Yokohama, Japan

[73] Assignee: Nissan Motor Co., Ltd., Kanagawa, Japan

[21] Appl. No.: 576,357

[22] Filed: Dec. 21, 1995

[30] Foreign Application Priority Data

Dec. 26, 1994 [JP] Japan ............................ 6-323402

[51] Int. Cl.⁶ ............................................. B60K 17/35
[52] U.S. Cl. ............................ 180/248; 364/424.098
[58] Field of Search ........................... 180/233, 247, 180/248, 249, 250, 197; 364/424.098

[56] References Cited

U.S. PATENT DOCUMENTS

| | | | |
|---|---|---|---|
| 5,060,747 | 10/1991 | Eto | 180/249 X |
| 5,270,930 | 12/1993 | Ito et al. | 364/424.098 |
| 5,346,032 | 9/1994 | Sasaki | 180/233 |

FOREIGN PATENT DOCUMENTS 63-203421  8/1988  Japan .

*Primary Examiner*—Kevin Hurley
*Attorney, Agent, or Firm*—Lowe, Price, LeBlanc & Becker

[57] ABSTRACT

A driving-torque distribution control system for a four-wheel drive vehicle, comprises a transfer having a transfer clutch for variably adjusting a front and rear drive-wheel torque distribution, and a torque-split controller for setting a weighting coefficient to a lower speed of rotational speeds of secondary drive wheels depending on a wheel-load shift between the secondary drive wheels e.g. a lateral acceleration exerted on the vehicle or a rolling moment. The controller calculates a simple mean of rotational speeds of primary drive wheels, and also calculates a weighted mean of rotational speeds of the secondary drive wheels based on the weighting coefficient so as to control the transfer clutch in accordance with the front and rear drive-wheel torque distribution based on a difference between the simple mean and the weighted mean. The weighting coefficient is held constant until the lateral acceleration exceeds a predetermined threshold.

5 Claims, 3 Drawing Sheets

DRIVING-TORQUE DISTRIBUTION CONTROL SYSTEM FOR FOUR-WHEEL DRIVE VEHICLES

BACKGROUND OF THE INVENTION

1. Field of the Invention

The present invention relates to a driving-torque distribution control system for four-wheel drive vehicles, often called an active torque-split control system, for actively controlling a driving-torque distribution between primary drive wheels (a primary drive axle) and secondary drive wheels (a secondary drive axle), and specifically to a system which can properly control a front and rear wheel driving-torque distribution ratio depending on a difference between a rotational speed of a front drive wheel and that of a rear drive wheel.

2. Description of the Prior Art

Recently, there have been proposed and developed various active torque-split control systems for four-wheel drive vehicles, in which driving torque transmitted to secondary drive wheels is variably and actively controlled by way of adjustment of an engaging force of a transfer clutch operably disposed in a transfer device which is connected to both front and rear propeller shafts, so as to achieve proper torque distribution between front and rear drive axles. One such automobile active torque-split control system has been disclosed in Japanese Patent Provisional Publication (Tokkai Showa) No. 63-203421. In such a conventional four-wheel drive vehicle with an active torque-split control system, the system calculates a rotational speed difference between front and rear drive wheels, and also controls the front and rear drive wheel driving-torque distribution based on the rotational speed difference, so as to deliver a part of driving torque from the slipping less-traction wheel to the almost non-slipping greater traction, thus effectively and quickly suppressing skid tendencies of the less-traction wheel, and consequently providing greatly improved traction. For example, in a four-wheel drive vehicle of a rear-wheel-drive base mode in which the rear wheels serve as primary drive wheels, and front drive wheels serve as secondary drive wheels, that is the vehicle is usually operated at a two-wheel drive mode, when rapidly accelerating with great acceleration on dry pavement, the rear drive wheels will turn 10% or more faster than the front drive wheels. In this case, the controller increasingly controls the engaging force of the transfer clutch, to escape a part of driving torque from the rear drive wheel to the front drive wheels via the transfer, thus preventing rear-wheel spin or skid. The driving-torque distribution ratio between front and rear wheels generally varies among 0:100% to 50%:50%, depending upon the rotational speed difference between the front (secondary) and rear (primary) drive wheels. As can be appreciated, the rotational speed difference must be precisely calculated to provide a proper front-and-rear-wheel torque distribution. As is generally known, the above-noted rotational speed difference is arithmetically derived and calculated as a difference between a simple mean of the front-left and front-right drive wheel speeds detected and a simple mean of the rear-left and rear-right drive wheel speeds detected. However, such a conventional system suffers from the drawback that, when the front-inner wheel spin begins to develop particularly during acceleration-turning with both a great longitudinal acceleration and a great lateral acceleration, there is a tendency for the mean rotational speed of the front wheels (the secondary drive wheels) to rise suddenly owing to shift of wheel-load from the inner wheel to the outer wheel. In such a case, the controller will unintendedly estimate or calculate a greatly increased mean rotational speed of the secondary drive wheels, thus undesiredly reducing the rotational speed difference between the primary and secondary drive wheels. Owing to such an improper torque distribution ratio, adequate driving torque cannot be transmitted to the secondary drive wheels. Additionally, it is undesirable that there is an abrupt change in front and rear driving-torque distribution, resulting from the above-noted sudden rise in the mean rotational speed of the secondary drive wheels during cornering.

SUMMARY OF THE INVENTION

Accordingly, it is an object of the invention to provide an improved driving-torque distribution control system for four-wheel drive vehicles which avoids the foregoing disadvantages of the prior art.

It is another object of the invention to provide a driving-torque distribution control system for four-wheel drive vehicles with active driving-torque compensation between front and rear drive wheels, which can ensure a more precise torque distribution by the aid of calculation of a more appropriate estimate of a mean rotational speed of secondary drive wheels, even when wheel-spin takes place at one of secondary drive wheels owing to great shift of wheel-load with respect to left and right drive wheels, for example during acceleration turning with both a high lateral acceleration and a high longitudinal acceleration.

It is a further object of the invention to provide a driving-torque distribution control system for four-wheel drive vehicles with active driving-torque compensation between front and rear drive wheels, which can prevent a front and rear driving-torque distribution ratio from varying abruptly even when wheel-spin occurs at the inner wheel of secondary drive wheels during cornering with a high lateral acceleration.

It is a still further object of the invention to provide a driving-torque distribution control system for four-wheel drive vehicles with active driving-torque compensation between front and rear drive wheels, which can provide a reliable active torque-distribution control with disturbance compensation according to which a control command of the system can be unaffected by undesired disturbance resulting from slight fluctuations in wheel-speed difference between right and left wheels in the secondary drive side and/or from slight fluctuations in wheel-load of each of the right and left wheels during normal straight-road driving.

In order to accomplish the aforementioned and other objects of the invention, a driving-torque distribution control system for a four-wheel drive vehicle comprises a transfer having a transfer clutch for variably adjusting a torque distribution between front and rear drive wheels, sensor means for detecting an amount of shift of wheel-load from one of left and right wheels included in the secondary drive wheels to no another, weighting means responsive to the amount of shift of wheel-load for setting a weighting coefficient to a lower speed of rotational speeds of the left and right wheels included in the secondary drive wheels, means for calculating a simple mean of rotational speeds of primary drive wheels, and for calculating a weighted mean of rotational speeds of the secondary drive wheels based on the weighting coefficient, and means for controlling the transfer clutch in accordance with the torque distribution based on a difference between the simple mean and the weighted mean. It is preferable that the weighting means maintains the weighting coefficient constant so that the weighted mean of rotational speeds of the secondary drive wheels is identical to a simple mean of rotational speeds of the secondary drive wheels, until the amount of shift of wheel-load exceeds a predetermined threshold. After the amount of shift of wheel-load exceeds the predetermined threshold, the weighting means increases the weighting coefficient in accordance with an increase in the amount of shift of wheel-load. Preferably, the weighting means may linearly increase the weighting coefficient in proportion to an increase in the amount of shift of wheel-load after the predetermined threshold has been reached. To ensure a simple detection for the wheel-load shift, it is preferable that the sensor means detects a lateral acceleration exerted on the vehicle. Alternatively, the sensor means may detect a steering angle and a velocity of the vehicle.

According to another aspect of the invention, an active torque-split control system for a four-wheel drive vehicle, responsive to a wheel-speed difference between primary and secondary drive wheels for actively controlling a torque distribution of driving-torque produced by an engine between front and rear drive wheels, the system comprises a transfer having a transfer clutch, for variably adjusting the torque distribution, sensor means for detecting an amount of shift of wheel-load from an inner wheel of the secondary drive wheels to an outer wheel, selection means for selecting a lower speed of rotational speeds of the secondary drive wheels and a faster speed of the rotational speeds of the secondary drive wheels, weighting means responsive to the amount of shift of wheel-load for setting a weighting coefficient to the lower speed, means for calculating a representative rotational speed of the secondary drive wheels as a weighted mean based on the weighting coefficient when the amount of shift of wheel-load exceeds a predetermined threshold, and for calculating the representative rotational speed of the secondary drive wheels as a simple mean when the amount of shift of wheel-load is below the predetermined threshold, means for calculating a representative rotational speed of the primary drive wheels as a simple mean, and means for controlling the transfer clutch in accordance with the torque distribution based on a wheel speed difference between the representative rotational speed of the primary drive wheels and the representative rotational speed of the secondary drive wheels.

DESCRIPTION OF THE PREFERRED EMBODIMENTS

Figure 1:
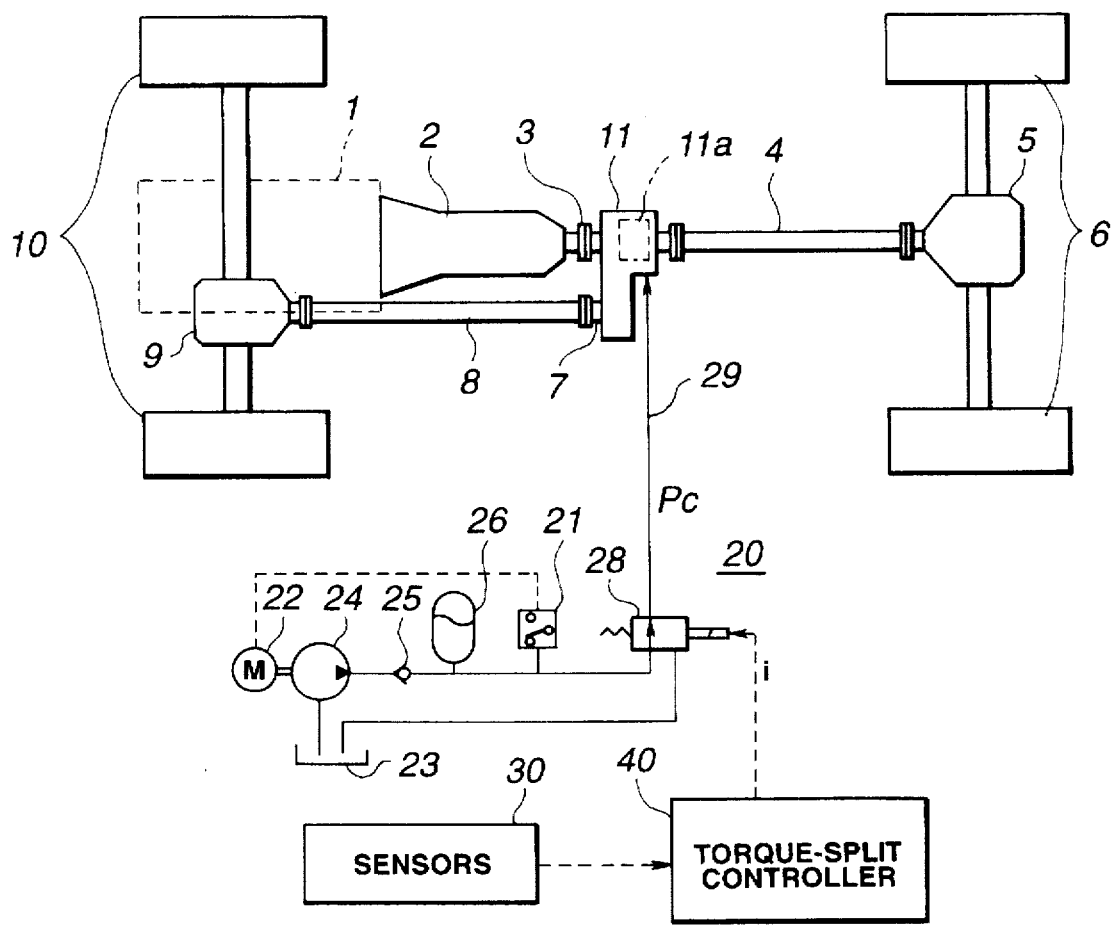
FIG. 1 is a schematic system diagram illustrating a driving-torque distribution control system made according to the invention.

Referring now to the drawings, particularly to FIG. 1, the driving-torque distribution control system of the invention is exemplified in case of a four-wheel drive system applied to a front-engine four-wheel drive vehicle of a rear-wheel-drive basic mode in which driving-torque (power) produced by a prime mover such as an internal combustion engine 1 is usually delivered to the rear drive wheels, that is, the front and rear wheel driving-torque distribution ratio is usually set at 0:100%. The four-wheel drive system is controlled by means of a torque-split controller 40, as described herebelow in detail. As is generally known, the four-wheel drive system includes a transmission 2 transmitting power produced by the engine 1, a transfer input shaft 3, a rear propeller shaft 4, a rear differential 5 being connected through rear-wheel drive axles to rear drive wheels (primary drive wheels) 6, a transfer output shaft 7, a front propeller shaft 8, a front differential 9 being connected through front-wheel drive axles to front drive wheels (secondary drive wheels) 10. The rear propeller shaft 4 and the rear differential 5 are included in the rear-wheel drive system, whereas the transfer output shaft 7, the front propeller shaft 8 and the front differential 9 are included in the front-wheel drive system. The transmission 2 and the transfer input shaft 3 are both included in both the front and rear drive systems. The transfer input shaft 3 is connected to the transmission output shaft and also connected through a transfer device 11 to both the rear propeller shaft 4 and the front propeller shaft 8, so as to distribute the engine power into the front and rear drive wheels. The front and rear propeller shafts 8 and 4 are respectively connected to the front and rear differentials 9 and 5. Although it is not clearly shown in FIG. 1, the transfer device 11 operably accommodates a transfer clutch 11a in its transfer case. The transfer clutch 11a is generally comprised of a wet multiple disc friction clutch, serving as a torque distribution clutch. As seen in FIG. 1, for the purpose of suitably controlling a driving-torque distribution between front and rear wheels, and thus satisfying a superior controllability of the vehicle and enhancing a driving performance such as traction and cornering force, the driving-torque distribution control system of the embodiment has the transfer device 11, a controlled pressure generator 20 generating a controlled hydraulic pressure Pc, various sensors 30 generating input information, and the torque-split controller 40 responsive to signals from the sensors 30 for outputting a driving current i to an electromagnetic solenoid incorporated in a solenoid valve 28. As detailed later, the engaging force of the clutch 11a is determined by the controlled hydraulic pressure Pc from the generator 20, while the magnitude of the driving current i is determined on the basis of input information from the sensors 30.

The controlled pressure generator 20 comprises an electric motor 22 which is activated or de-activated by means of a relief switch 21, a hydraulic pump 24 having a driven connection with the motor 22 to pressurize working fluid in an oil reservoir 23, a pressure accumulator 26 which accumulates pressurized working fluid fed from the pump 23 through a check valve 25 thereto to regulate a discharge pressure (a primary fluid pressure) of the pump 23 and thus to produce a regulated fluid pressure (a secondary fluid pressure) corresponding to a stable line pressure, and the solenoid valve 28. The solenoid valve 28 generates the controlled pressure Pc based on the magnitude of the driving current i output from the torque-split controller 40. The controlled pressure Pc is supplied through a fluid line 29 to the inlet port of the transfer clutch 11a in order to variably control the engaging force of the clutch 11a. The higher the controlled pressure Pc, the greater the engaging force of the clutch 11a. Conventionally, the front and rear wheel driving-torque distribution ratio is shifted from 0:100% (i.e., the rear-wheel drive mode) to 50%:50% (i.e., the four-wheel drive mode e.g. a rigid 4WD mode), as the engaging force of the transfer clutch 11a is adjusted toward a maximum value.

Figure 2:
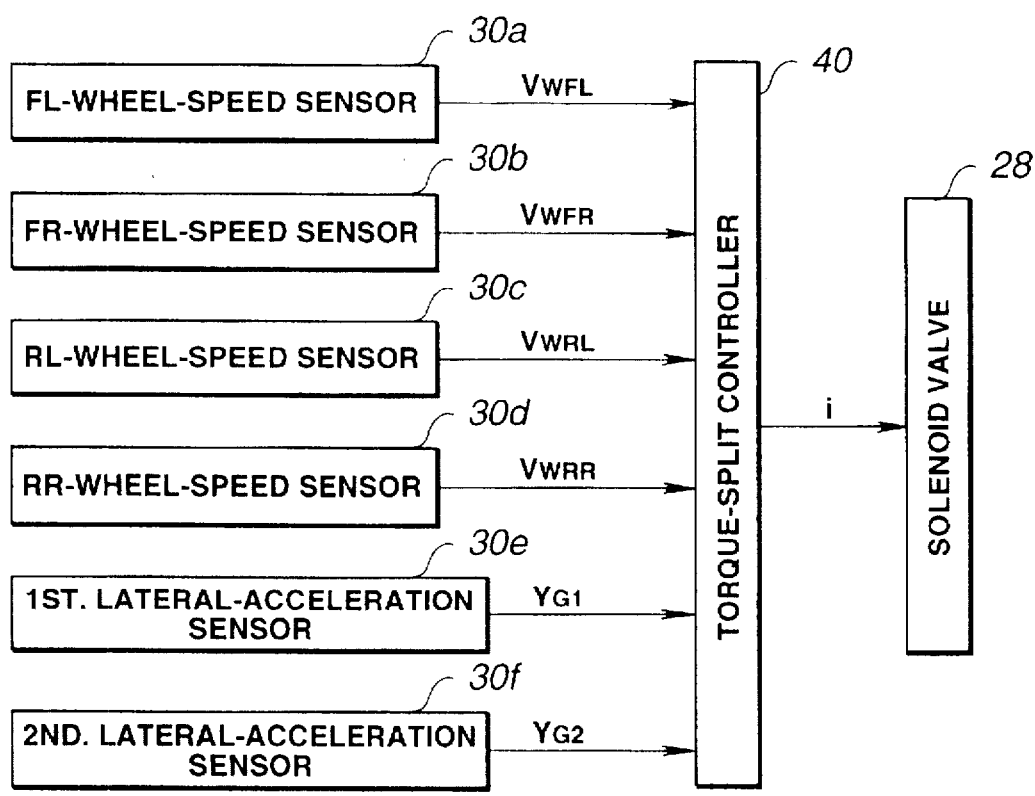
FIG. 2 is a block diagram illustrating an electronic control system employed in the system of the invention.

As appreciated from the block diagram shown in FIG. 2, in the shown embodiment, the sensors 30 are comprised of a front-left wheel speed sensor 30a, a front-right wheel speed sensor 30b, a rear-left wheel speed sensor 30c, a rear-right wheel speed sensor 30d, a first lateral-acceleration sensor 30e and a second lateral-acceleration sensor 30f. The sensor 30a generates a front-left wheel speed indicative signal VwFL indicative of a rotational speed of the front-left road wheel, the sensor 30b generates a front-right wheel speed indicative signal VwFR indicative of a rotational speed of the front-right road wheel, the sensor 30c generates a rear-left wheel speed indicative signal VwRL indicative of a rotational speed of the rear-left road wheel, and the sensor 30d generates a rear-right wheel speed indicative signal VwRR indicative of a rotational speed of the rear-right road wheel. In the embodiment, the sensor 30e is attached to a first predetermined place of the front half of the vehicle body for generating a first lateral-acceleration indicative signal YG1 indicative of a lateral acceleration exerted on the vehicle at the first predetermined place, while the sensor 30f is attached to a second predetermined place of the rear half of the vehicle body for generating a second lateral-acceleration indicative signal YG2 indicative of a lateral acceleration exerted on the vehicle at the second predetermined place. As seen in FIG. 2, the signal lines of the sensors 30a, 30b, 30c, 30d, 30e and 30f are connected to the input interface of the torque-split controller 40. The output interface of the torque-split controller 40 is connected to the solenoid valve 28 so as to output the solenoid driving current i (an exciting current) of a controlled current value to the solenoid. The control procedure of the torque-split controller 40 will be herebelow discussed in detail in accordance with the flow chart shown in FIG. 3. The control routine of the controller 40 is executed as time-triggered interrupt routines to be triggered every predetermined time intervals.

In step S1, read in are the front-left wheel speed indicative signal value VwFL, the front-right wheel speed indicative signal value VwFR, the rear-left wheel speed indicative signal value VwRL, the rear-right wheel speed indicative signal value VwRR, the first lateral-acceleration indicative signal value YG1 and the second lateral-acceleration indicative signal value YG2.

In step S2, a simple mean (YG1+YG2)/2 of the first and second lateral-acceleration indicative signal values YG1 and YG2 is calculated and also the calculated simple mean (YG1+YG2)/2 is set as a representative lateral acceleration YG used for the driving-torque distribution control. As appreciated, the representative lateral acceleration YG itself can be regarded as being equivalent to a degree or an amount of wheel-load shift between the front-left and front-right wheels or substantially to a rolling moment, because the representative lateral acceleration YG is greatly correlated to the wheel-load shift from the inner wheel to the outer wheel.

In step S3, by way of comparison between the front-left wheel speed indicative signal value VwFL and the front-right wheel speed indicative signal value VwFR, the higher one of the two signal values VwFL and VwFR is set as a higher front-wheel speed VwFMAX, and also the lower one of the two signal values VwFL and VwFR is set as a lower front-wheel speed VwFMIN.

In step S4, a simple mean (VwRL+VwRR)/2 of the rear-left wheel speed indicative signal value VwRL an the rear-right wheel speed indicative signal value VwRR is calculated and then the calculated simple mean (VwRL+VwRR)/2 is set as a representative rear-wheel speed (a representative primary drive wheel speed) VwR.

In step S5, a weighting coefficient RM is derived from a predetermined lateral-acceleration YG versus weighting coefficient RM characteristic indicated in of step S5, on the basis of the lateral acceleration YG calculated at step S2. As appreciated from the YG-RM characteristic, the weighting coefficient RM is held at "5" when the lateral acceleration YG is less than or equal to 0.6G (G is the acceleration of gravity), and proportionally increases from "5" to an upper limit "10" in accordance with the increase in the lateral acceleration YG after the lateral acceleration YG exceeds the 0.6G and gradually increases up to 1.0G. The above-noted YG-RM characteristic is pre-stored in the memory of the controller 40 in the form of data map in a conventional manner.

In step S6, a weighted mean of the higher front-wheel speed VwFMAX and the lower front-wheel speed VwFMIN is calculated and derived from the following expression.

$$VwF=\{(10-RM) \times VwFMAX + RM \times VwFMIN\}$$

The weighted mean $\{(10-RM) \times VwFMAX + RM \times VwFMIN\}$ is set as a representative front-wheel speed (a representative secondary drive wheel speed) VwF. As may be appreciated, the weighted mean $\{(10-RM) \times VwFMAX + RM \times VwFMIN\}$ set as the representative secondary drive wheel speed VwF is identical to a simple mean of the front-left and front-right wheel speed indicative signal values VwFL and VwFR only in the case that the weighting coefficient RM is equal to "5". Weighting to the lower front-wheel speed VwFMIN becomes greater and weighting to the higher front-wheel speed VwFMAX becomes less, as the weighting coefficient RM is gradually increased from "5" to "10". In other words, the lower front-wheel speed VwFMIN exerts a greater influence on the representative secondary drive wheel speed VwF in accordance with the increase in the weighting coefficient RM.

In step S7, calculated by the following expression is a wheel-speed difference ΔVw between the representative rear-wheel speed (the representative primary drive wheel speed) VwR and the representative front wheel speed representative primary drive wheel speed) VwF.

$$\Delta Vw = VwR - VwF$$

In step S8, a transfer-clutch engaging force (engaging torque) TETS is calculated and derived as the product of the wheel speed difference ΔVw and a predetermined control gain Kh according to an expression TETS=ΔVw×Kh.

In step S9, the calculated transfer-clutch engaging torque TETS is converted into a solenoid driving current i on the basis of a preselected translation table or conversion table, and then the solenoid driving current i is output to the solenoid valve 28. As a result of this, the front and rear wheel driving-torque distribution can be properly controlled depending upon the controlled pressure Pc based on the solenoid current i.

With the above-explained arrangement, during acceleration-turning with both a great lateral acceleration, in the event that the inner wheel of the front drive wheels (the secondary drive wheels) experiences lighter wheel load and the outer wheel experiences heavier wheel load and thus the inner-wheel spin occurs, weighting to the rotational speed of the non-spinning greater-traction outer wheel (the slower wheel) tends to become greater whereas weighting to the rotational speed of the spinning less-traction inner wheel (the faster wheel) tends to become less. As set forth above, since the representative front wheel speed (the representative secondary drive wheel speed) VwF can be derived through the weighted mean method, the system can avoid the representative front-wheel speed VwF from being estimated as an excessively great value owing to an abrupt rise of the rotational speed of the inner wheel, even when the inner-wheel spin will take place during acceleration-turning with a great lateral acceleration. That is, in case that the vehicle experiences wheel-spin at the inner wheel during acceleration-turning, the front and rear wheel speed difference can be calculated or estimated essentially on the basis of the rotational speed of the non-spinning outer wheel.

Accordingly, when acceleration slip takes place at rear wheels which function as primary drive wheels and also the inner-wheel spin begins to develop at the inner wheel of the front wheels which function as secondary drive wheels during acceleration-turning with a great lateral acceleration, the system can prevent the front and rear wheel speed difference from being reduced extremely, thus ensuring a proper torque distribution between front and rear wheels and preventing loss of traction. On the other hand, during normal straight-road driving, there are slight fluctuations in the difference between front-left and front-right wheel speeds and/or slight fluctuations in wheel-load of each of the front-left and front-right wheels. Owing to such disturbance, the representative front-wheel speed VwF may fluctuate cyclically. To avoid this, a threshold value such as 0.6G is provided with respect to the lateral acceleration YG (corresponding to the degree of wheel-load shift between the front-left and front-right wheels). The threshold value is preset at a minimum lateral acceleration such as 0.6G above which wheel-spin may occur at inner wheels. Thus, during normal straight-road driving, the representative front-wheel speed VwF is usually calculated as a simple mean of the front-left and front-right wheel speed indicative signal values VwFL and VwFR. Therefore, the system of the embodiment can ensure a proper torque distribution, while avoiding the front-wheel speed VwF from affected by undesired disturbance during straight-ahead driving. Irrespective of during acceleration-turning or during straight-road driving, the system can enhance reliability in active torque-split control, and thus provide a precise, stable driving-torque distribution between front and rear drive wheels.

Figure 3:
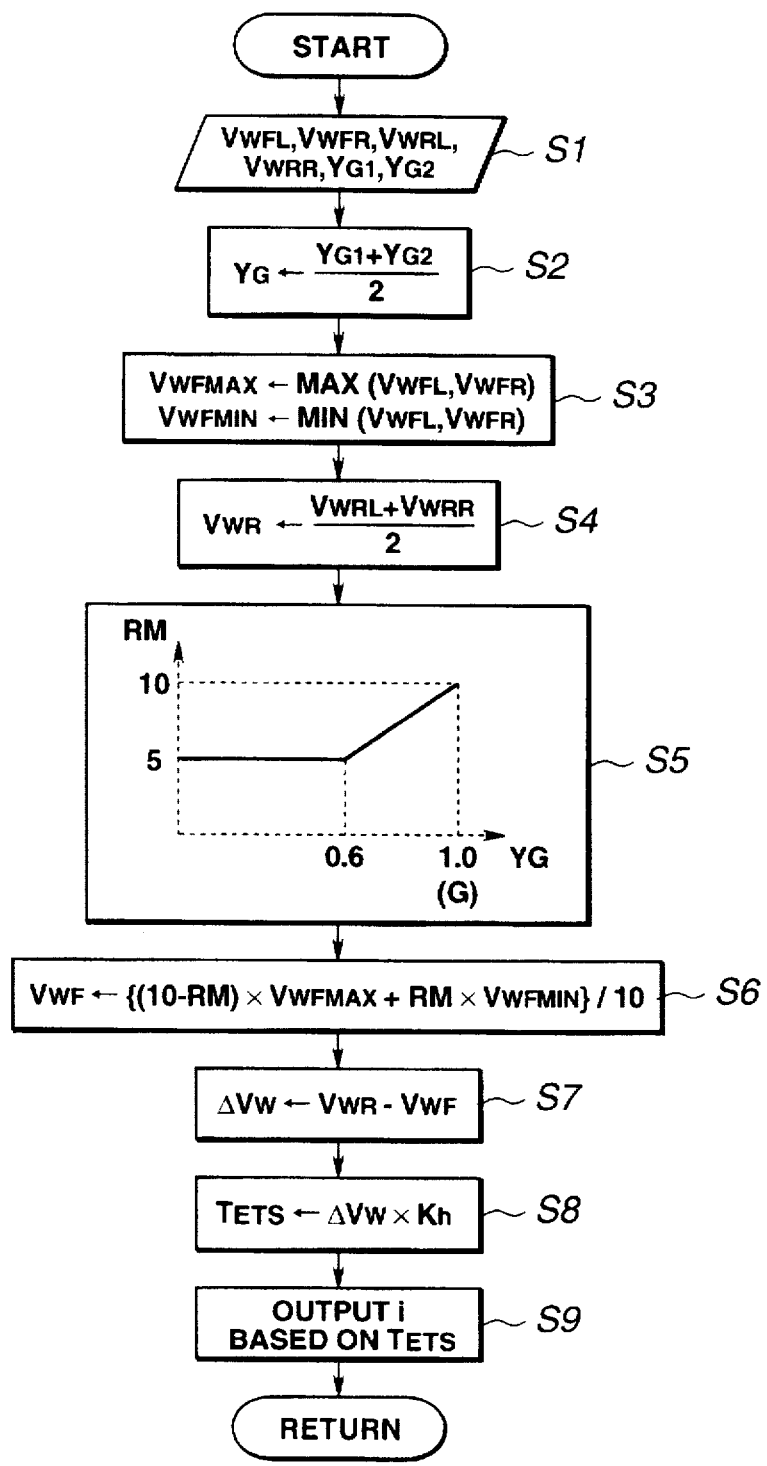
FIG. 3 is a flow chart illustrating a control routine executed by the active torque-split controller incorporated in the system of the invention.

Furthermore, when the lateral acceleration exerted on the vehicle exceeds the predetermined threshold e.g. 0.6G and then continues to increase, as appreciated from steps S5 and S6 of FIG. 3, the weighting coefficient RM (weighting with respect to the rotational speed VwFMIN of the non-spinning, greater-traction, slower outer wheel) is linearly increased essentially in proportion to the increase in the lateral acceleration YG (the degree of wheel-load shift between the secondary drive wheels), and whereby the system can unaffected by an abrupt rise in the wheel-speed difference between the front-left and front-right wheels which abrupt rise will result from wheel-spin during acceleration-turning with a lateral acceleration of 0.6G or more, and thus the torque distribution can be varied smoothly. Additionally, in the shown embodiment, the degree of wheel-load shift is estimated by the magnitude of lateral acceleration YG exerted on the vehicle in place of direct detection of the degree of wheel-load shift. Such a detection device for the wheel-load shift is very simple. Also, although the system of the embodiment uses two lateral acceleration sensors 30e and 30f in order to more precisely detect a lateral acceleration exerted on the vehicle, in lieu thereof, it will be appreciated that a sole lateral acceleration may be provided for detection of the lateral acceleration YG. On the assumption that the above-noted wheel-load shift between the front-left and front-right wheels occurs mainly during cornering, a steering angle and a vehicle velocity may be utilized for estimation of the degree of wheel-load shift. Alternatively, the wheel-load shift may be detected directly by monitoring expansion and contraction of the suspension of the vehicle.

Although the system of the embodiment is applied to a front-engine four-wheel drive vehicle of a rear-wheel-drive basic mode in which a front and rear wheel driving-torque distribution ratio is usually set at 0:100%, the system may be applied to a four-wheel drive vehicle of a front-wheel-drive basic mode in which the front and rear wheel driving-torque distribution ratio is usually set at 100%:0. In this case, since front drive wheels function as primary drive wheels while rear drive wheels function as secondary drive wheel, in order to ensure a proper driving-torque distribution between front and rear drive wheels, a representative wheel speed of the rear drive wheels can be estimated or calculated by way of a weighted mean method while a representative wheel speed of the front drive wheels can be estimated by way of a simple mean method.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A driving-torque distribution control system for a four-wheel drive vehicle, comprising:

a transfer having a transfer clutch for variably adjusting a torque distribution between front and rear drive wheels;

sensor means for detecting an amount of shift of wheel-load from one of left and right wheels included in said secondary drive wheels to another;

weighting means responsive to said amount of shift of wheel-load for setting a weighting coefficient to a lower speed of rotational speeds of said left and right wheels included in said secondary drive wheels;

means for calculating a simple mean of rotational speeds of primary drive wheels, and for calculating a weighted mean of rotational speeds of said secondary drive wheels based on said weighting coefficient; and means for controlling said transfer clutch in accordance with said torque distribution based on a difference between said simple mean and said weighted mean.

2. A driving-torque distribution control system as claimed in claim 1, wherein said weighting means maintains said weighting coefficient constant so that said weighted mean of rotational speeds of said secondary drive wheels is identical to a simple mean of rotational speeds of said secondary drive wheels, until said amount of shift of wheel-load exceeds a predetermined threshold, and said weighting means increases said weighting coefficient in accordance with an increase in said amount of shift of wheel-load after said amount of shift of wheel-load exceeds said predetermined threshold.

3. A driving-torque distribution control system as claimed in claim 2, wherein said weighting means linearly increases said weighting coefficient in proportion to an increase in said amount of shift of wheel-load after said predetermined threshold has been reached.

4. A driving-torque distribution control system as claimed in claim 1, wherein said sensor means detects a lateral acceleration exerted on the vehicle.

5. An active torque-split control system for a four-wheel drive vehicle, responsive to a wheel-speed difference between primary and secondary drive wheels for actively controlling a torque distribution of driving-torque produced by an engine between front and rear drive wheels, said system comprising:

a transfer having a transfer clutch for variably adjusting said torque distribution;

sensor means for detecting an amount of shift of wheel-load from an inner wheel of said secondary drive wheels to an outer wheel;

selection means for selecting a lower speed of rotational speeds of said secondary drive wheels and a faster speed of the rotational speeds of said secondary drive wheels;

weighting means responsive to said amount of shift of wheel-load for setting a weighting coefficient to said lower speed;

means for calculating a representative rotational speed of said secondary drive wheels as a weighted mean based on said weighting coefficient when said amount of shift of wheel-load exceeds a predetermined threshold, and for calculating said representative rotational speed of said secondary drive wheels as a simple mean when said amount of shift of wheel-load is below said predetermined threshold;

means for calculating a representative rotational speed of said primary drive wheels as a simple mean; and means for controlling said transfer clutch in accordance with said torque distribution based on a wheel speed difference between said representative rotational speed of said primary drive wheels and said representative rotational speed of said secondary drive wheels.

* * * * *